(12) United States Patent
Choy et al.

(10) Patent No.: US 7,944,184 B2
(45) Date of Patent: May 17, 2011

(54) STATIC COMPENSATOR APPARATUS FOR HVDC SYSTEM

(75) Inventors: Young Do Choy, Seoul (KR); Chan Ki Kim, Daejeon (KR); Young Hoon Kwan, Daejeon (KR); Seong Joo Lim, Seoul (KR); Hyoung Bae Moon, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 475 days.

(21) Appl. No.: 12/098,551

(22) Filed: Apr. 7, 2008

(65) Prior Publication Data

US 2009/0251111 A1 Oct. 8, 2009

(51) Int. Cl.
*H02P 11/00* (2006.01)
*H02P 9/00* (2006.01)
*H02H 7/06* (2006.01)
*F03D 9/00* (2006.01)
*H02P 9/04* (2006.01)
*H02J 1/10* (2006.01)
*H02J 3/38* (2006.01)
*H02J 7/34* (2006.01)

(52) U.S. Cl. .............. 322/37; 290/44; 307/44
(58) Field of Classification Search .......... 322/37; 290/44; 307/44
See application file for complete search history.

(56) References Cited

U.S. PATENT DOCUMENTS

| | | | |
|---|---|---|---|
| 5,225,712 A * | 7/1993 | Erdman ............... | 290/44 |
| 6,225,791 B1 * | 5/2001 | Fujii et al. ............ | 323/207 |
| 6,498,464 B1 * | 12/2002 | Doht et al. ........... | 323/247 |
| 6,512,966 B2 * | 1/2003 | Lof et al. ............. | 700/291 |
| 6,670,721 B2 * | 12/2003 | Lof et al. ............. | 290/44 |
| 6,747,370 B2 * | 6/2004 | Abe ..................... | 307/66 |
| 6,856,040 B2 * | 2/2005 | Feddersen et al. .... | 290/44 |
| 6,858,953 B2 * | 2/2005 | Stahlkopf ............. | 290/44 |
| 6,924,565 B2 * | 8/2005 | Wilkins et al. ....... | 290/44 |
| 6,933,625 B2 * | 8/2005 | Feddersen et al. .... | 290/44 |
| 6,946,751 B2 * | 9/2005 | Yoshida et al. ....... | 290/44 |
| 7,002,260 B2 * | 2/2006 | Stahlkopf ............. | 290/44 |
| 7,432,611 B2 * | 10/2008 | Stahlkopf ............. | 290/44 |
| 7,622,816 B2 * | 11/2009 | Stahlkopf ............. | 290/44 |
| 7,663,348 B2 * | 2/2010 | Oohara et al. ........ | 322/24 |
| 7,701,087 B2 * | 4/2010 | Eckroad et al. ...... | 307/46 |
| 7,782,023 B2 * | 8/2010 | Holguin ............... | 322/28 |
| 2001/0043013 A1 * | 11/2001 | Abe ..................... | 307/66 |
| 2003/0011348 A1 * | 1/2003 | Lof et al. ............. | 322/37 |
| 2004/0183307 A1 * | 9/2004 | Yoshida et al. ....... | 290/44 |
| 2004/0207207 A1 * | 10/2004 | Stahlkopf ............. | 290/44 |
| 2005/0012395 A1 * | 1/2005 | Eckroad et al. ...... | 307/44 |
| 2005/0040655 A1 * | 2/2005 | Wilkins et al. ....... | 290/44 |

(Continued)

FOREIGN PATENT DOCUMENTS

JP 61177519 A * 8/1986

(Continued)

*Primary Examiner* — T. C. Patel
*Assistant Examiner* — Pedro J Cuevas
(74) *Attorney, Agent, or Firm* — Kenyon & Kenyon LLP (57) ABSTRACT

A static compensator apparatus for a HVDC system may control harmonic wave compensation at high passive speed to meet operating characteristics of the HVDC system. A static compensator is turned-on in a normal mode and compensates for invalid power and removes a harmonic wave generated by the high voltage direct current system. A static compensator controller controls an operation of the static compensator. A diesel power generator operates complementarily to the static compensator and being turned-on when the high voltage direct current system starts.

4 Claims, 10 Drawing Sheets

U.S. PATENT DOCUMENTS

| | | | |
|---|---|---|---|
| 2005/0062290 A1* | 3/2005 | Stahlkopf | 290/44 |
| 2006/0087124 A1* | 4/2006 | Stahlkopf | 290/44 |
| 2007/0035135 A1* | 2/2007 | Yoshida | 290/44 |
| 2008/0088183 A1* | 4/2008 | Eckroad et al. | 307/66 |
| 2009/0218817 A1* | 9/2009 | Cardinal et al. | 290/44 |
| 2009/0309421 A1* | 12/2009 | Angquist et al. | 307/46 |
| 2010/0013315 A1* | 1/2010 | Halvarsson | 307/66 |
| 2010/0171472 A1* | 7/2010 | Angquist | 323/207 |
| 2010/0207594 A1* | 8/2010 | Davoudi et al. | 323/283 |
| 2010/0259102 A1* | 10/2010 | Guelbenzu et al. | 307/65 |
| 2010/0292852 A1* | 11/2010 | Gertmar et al. | 700/287 |

FOREIGN PATENT DOCUMENTS

| | | | | |
|---|---|---|---|---|
| JP | 63144724 A | * | 6/1988 |
| JP | 63186532 A | * | 8/1988 |
| JP | 63277427 A | * | 11/1988 |
| JP | 63290126 A | * | 11/1988 |
| JP | 63290127 A | * | 11/1988 |
| JP | 01005329 A | * | 1/1989 |
| JP | 01008831 A | * | 1/1989 |
| JP | 04121024 A | * | 4/1992 |
| JP | 08030343 A | * | 2/1996 |

* cited by examiner

PRIOR ART

FIG. 3

PRIOR ART

FIG. 4

PRIOR ART

STATIC COMPENSATOR APPARATUS FOR HVDC SYSTEM

FIELD OF THE INVENTION

The present invention relates to a high voltage direct current (HVDC) system, and more particularly to a static compensator (STATCOM) for an HVDC system.

BACKGROUND INFORMATION

Although HVDC systems are an idea power generator without inertia, they generate a harmonic wave and consume invalid power. To resolve these problems, a harmonic wave filter, an invalid power compensator such as static VAR (voltage amperes reactive) compensator or STATCOM, and a synchronous phase modifier have been used. However, the invalid power compensator is not associated with the HVDC suitably and a control performance is not secure enough.

Figure 1:
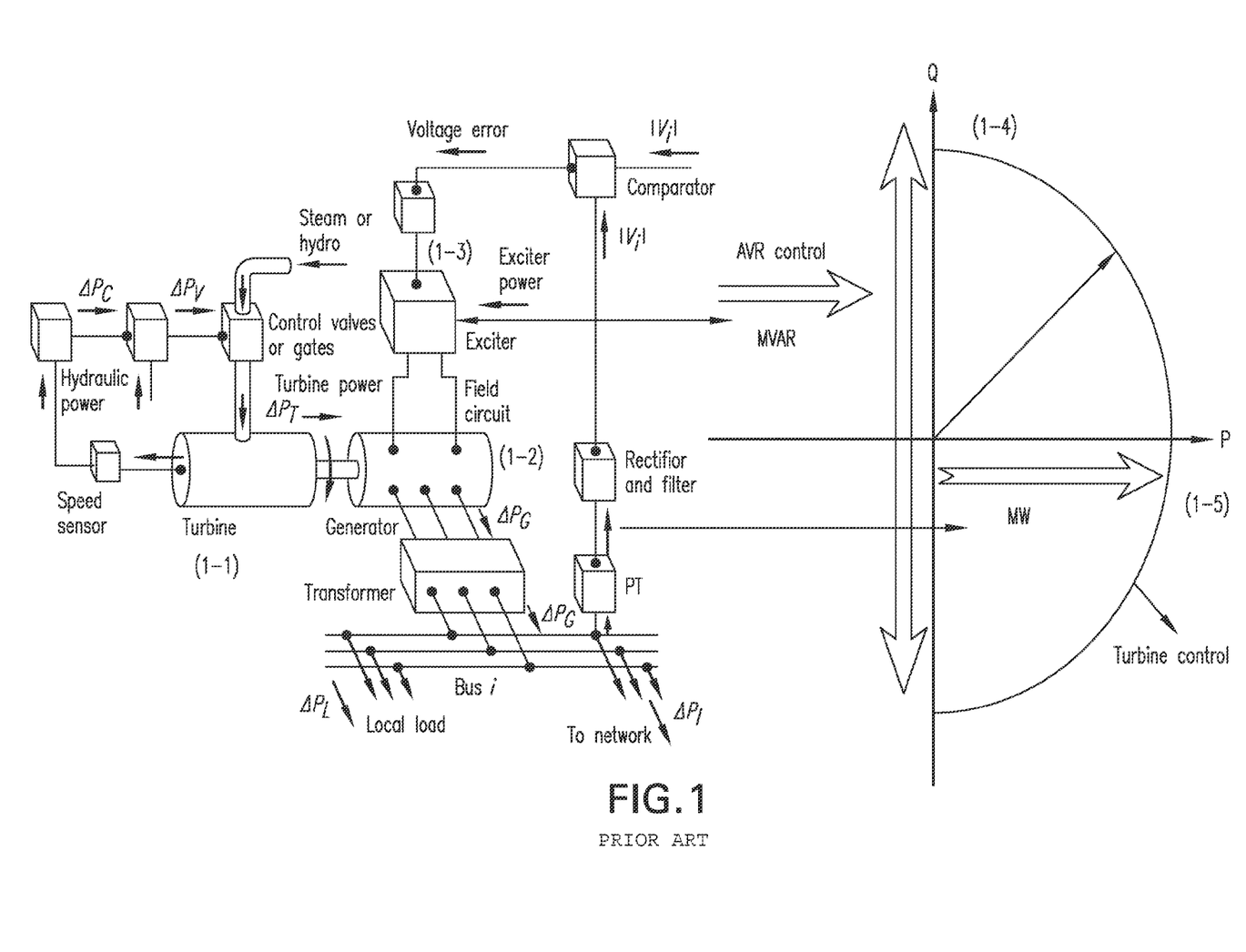
FIG. 1 shows a conventional synchronous power generator system.

FIG. 1 illustrates a conventional synchronous power generator system. A turbine 1-1 controls a frequency and valid power of the synchronous power generator system. An exciter 1-3 controls invalid power and voltages of the synchronous power generator system. The valid power of the synchronous power generator system is expressed by a first area 1-5, and the invalid power of the synchronous generator system is expressed by a second area 1-4.

Figure 2:
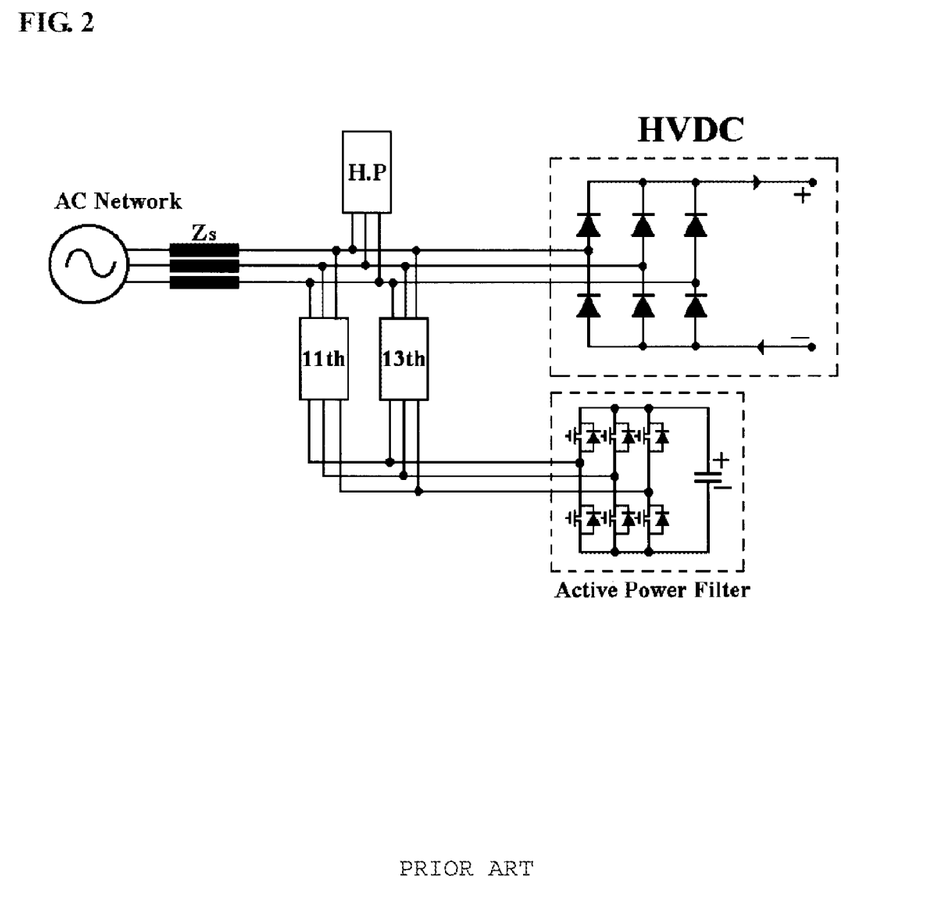
FIG. 2 is a circuitry diagram showing a conventional hybrid active filter as an example of a power filter for 12-pulse HVDC system.

FIG. 2 is a circuitry diagram showing a conventional hybrid active filter as an example of a power filter for 12-pulse HVDC system. In a passive filter, as time goes by, filter parameters are fluctuated due to the degradation. The passive filter is operatively associated with impedance of a system, which are not known exactly. This causes the stability of the system to be reduced. In contrast to this, because an active filter removes a harmonic wave of the system using a switching element, it has an advantage that may overcome sensitivity to parameters of the passive filter. Further, the hybrid active filter has low impedance at a specific harmonic wave and significantly great impedance of a filter at a fundamental frequency. Accordingly, there is a little electric current inputted from an alternating current power source side. Since the hybrid active filter supplies an electric current to the system at a specific harmonic wave to be removed and a voltage of the harmonic wave is zero, power consumption is small.

Figure 3:
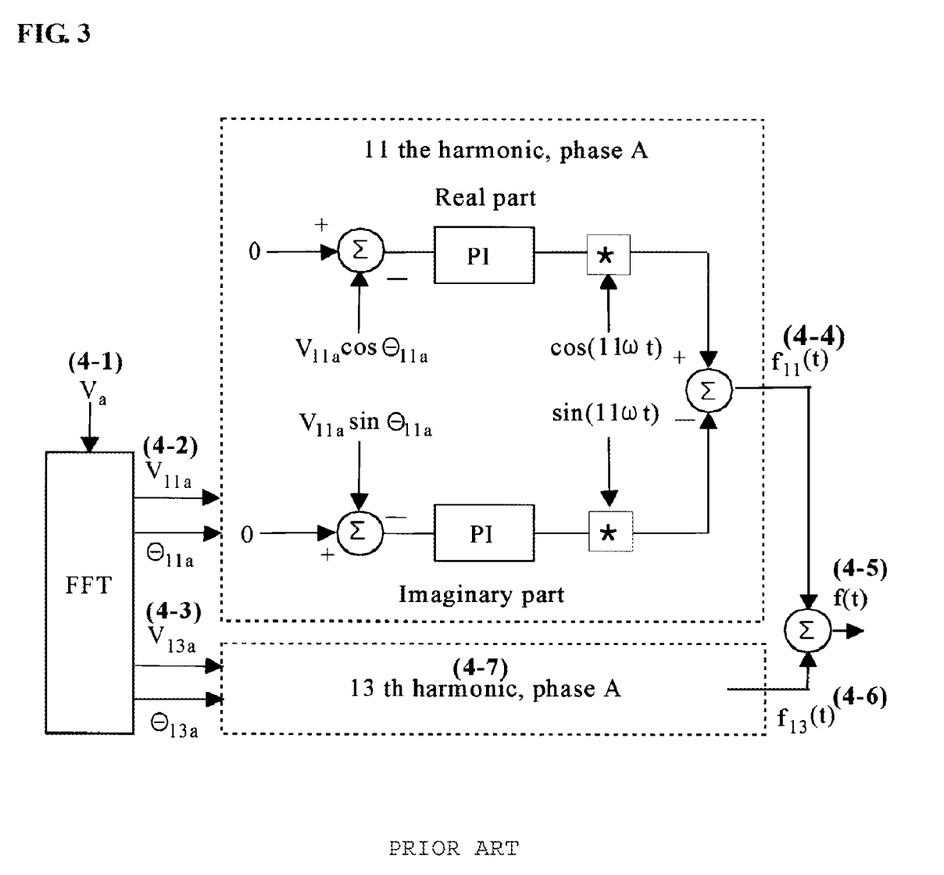
FIG. 3 is a view showing a control algorithm of the conventional hybrid active filter shown in FIG. 2.

FIG. 3 is a view showing a control algorithm of the conventional hybrid active filter shown in FIG. 2, which removes specific harmonic waves such as eleventh and thirteenth harmonic waves. The control algorithm of the hybrid active filter is an algorithm to generate a packing command signal in a phase A switching element of a passive filter.

The hybrid passive filter receives a voltage $V_a$ 4-1 measured in a phase A of the system as an input of a Fast Fourier Transform (FFT), and extracts a magnitude $V_{11a}$ and a phase $\theta_{11a}$ (4-2) of the eleventh harmonic wave, and a magnitude $V_{13a}$ and a phase $\theta_{13a}$ (4-3) of the thirteenth harmonic wave. The control system controls a harmonic wave voltage component to zero by two PI controllers. Outputs of the two PI controllers are changed to amounts of time areas, and the amounts of time areas are added to each other to become a voltage form of $f_{11}(t)$ (4-4). In the same manner, a control system is provided to calculate a voltage command $f_{13}(t)$ (4-6) for removing the thirteenth harmonic wave (4-7). In conclusion, the two voltage commands are added to each other to become a voltage command f(t) (4-5) of the phase A. The same algorithm is used to calculate respective voltage command in phases B and C. In other words, the control algorithm indicated in the hybrid passive filter separates the magnitudes and the phases of the eleventh and thirteen harmonic waves by the FFT, and controls the hybrid passive filter so that the respective separated harmonic components become zero.

Figure 4:
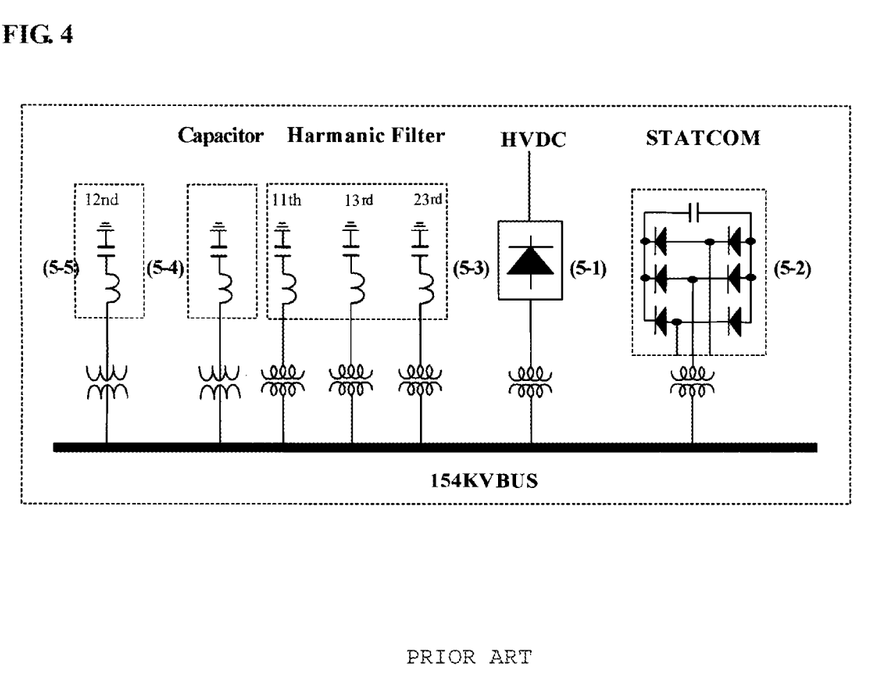
FIG. 4 is a circuitry diagram showing an conventional HVDC system having a STATCOM.

FIG. 4 is a circuitry diagram showing a conventional HVDC system having an STATCOM. The conventional HVDC system includes an HVDC 5-1, a STATCOM 5-2, a harmonic filter 5-3, and a capacitor 5-4. The HVDC 5-1 controls valid power. The STATCOM 5-2 compensates and controls invalid power. The harmonic filter 5-3 removes a harmonic wave generated by the HDVC 5-1.

There are three type HVDC systems having an HVDC. A first type HVDC system includes only the HDVC system 5-1 and a STATCOM 5-2. In this type, the STATCOM 5-2 removes a harmonic wave generated by the HDVC 5-1 and compensates and controls an invalid power. A second type HVDC system includes an HVDC 5-1, a STATCOM 5-2, a harmonic filter 5-3, and a capacitor 5-4. In this type, the STATCOM 5-2 controls an invalid power with high precision. Further, the STATCOM 5-2 adsorbs the invalid power at excessive operation as an auxiliary function. A third type HVDC system includes a twelfth filter 5-5 instead of the eleventh and thirteenth filters 5-3 in the second type HVDC system. In the third type HVDC system, the STATCOM functions to compensate detuning of the filter.

SUMMARY

Example embodiments of the present invention provide a static compensator apparatus for a HVDC system, which may control harmonic wave compensation at high passive speed to meet operating characteristics of the HVDC system.

Example embodiments of the present invention provide a static compensator apparatus for a high voltage direct current system including: a static compensator being turned-on in a normal mode, and for compensating for invalid power and removing a harmonic wave generated by the high voltage direct current system; a static compensator controller for controlling an operation of the static compensator; and a diesel power generator operating complementarily to the static compensator and being turned-on when the high voltage direct current system starts.

The static compensator controller may include: a signal detector for calculating a phase voltage and a phase of a fundamental wave based on a system phase voltage in an FFT manner; a control unit for generating Q and H command part values based on the phase voltage and the phase of a fundamental wave from the signal detector; and a firing unit for comparing the Q and H command part values with a chopping wave, and for generating control voltages to control the operation of the static compensator according to the comparison result.

Further features and aspects of example embodiments of the present invention are described in more detail below with reference to the appended Figures.

DETAILED DESCRIPTION

Example embodiments of the present invention are described with reference to the accompanying drawings. Here, when one component is described or illustrated as being connected to another component, one component may be not only directly connected to another component but also indirectly connected to another component via another component. Further, certain components may be omitted for clarity. Also, like reference numerals refer to like elements throughout.

Figure 5:
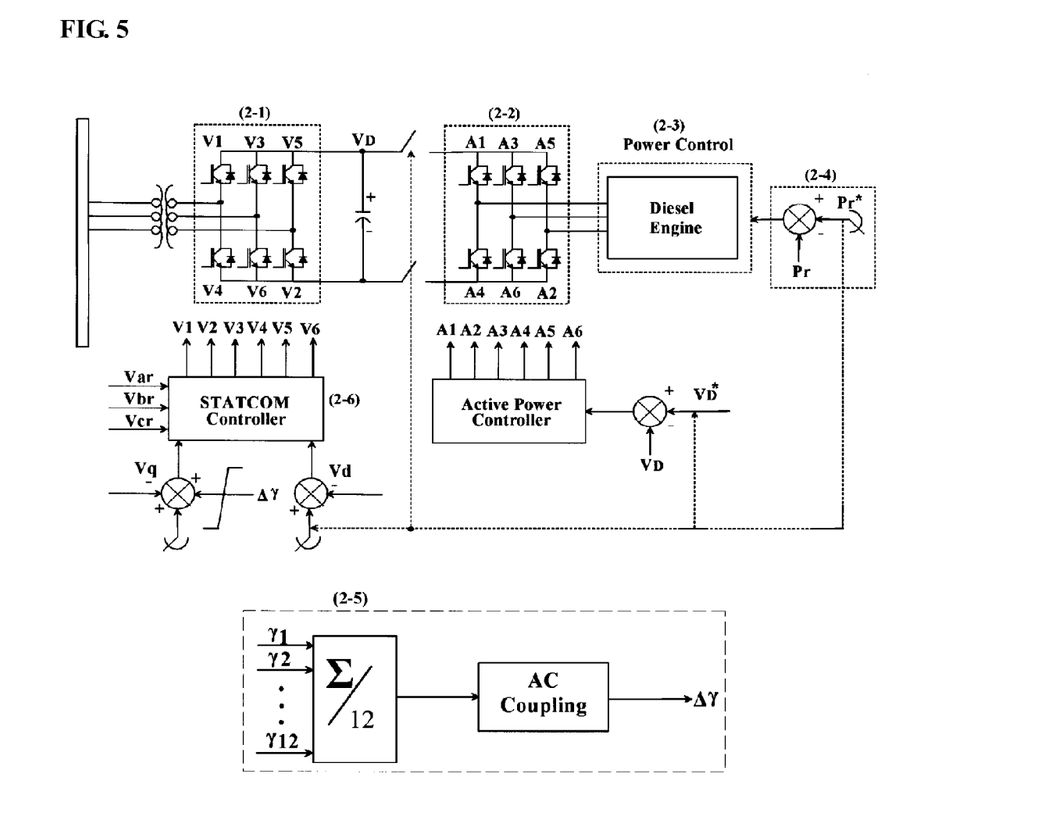
FIG. 5 is a circuitry diagram showing a static compensator apparatus having a diesel power generator according to an example embodiment of the present invention.

FIG. 5 is a circuitry diagram showing a static compensator apparatus for an HVDC system having a diesel power generator according to an example embodiment of the present invention. The static compensator apparatus for a high voltage direct current system includes a static compensator 2-1, a static compensator controller 2-6, and a diesel power generator 2-3.

The static compensator 2-1 is turned-on in a normal mode and compensates for invalid power and removes a harmonic wave generated by the HVDC system. The static compensator controller 2-6 controls an operation of the static compensator 2-1. The diesel power generator 2-3 operates complementarily to the static compensator 2-1. The diesel power generator is turned-on when the HVDC system starts.

In a normal mode, the apparatus is operated as only a static compensator 2-1. However, at a start of the HVCD or in a special situation, the apparatus starts the diesel power generator 2-3 to apply an output of the diesel power generator 2-3 to the system.

A valid power command value Pr* of the diesel power generator 2-3 is identical with a DC voltage command value Vd* of the STATCOM controller and a DC voltage command value VD* of a converter. Here, the converter supplies power to the STATCOM 2-1. Accordingly, when the diesel power generator 2-3 is not used, the valid power command value Pr* of the diesel power generator 2-3a is off. Further, since the valid power command value Pr* of the diesel power generator 2-3 is operatively associated with the DC voltage command value Vd* of the STATCOM controller and the DC voltage command value VD* of a converter, only the STATCOM can be individually operated.

A mean gamma controller 2-5 monitors an average of gamma values in the HVDC system, and uses it as a control input of the STATCOM. In general, the gamma values are parameters, which directly respond to a valid power or a control variation in an HVDC inverter terminal. Accordingly, the variation of the gamma values is used as an input of the STATCOM to simultaneously satisfy a quick response of the STATCOM and the stability of the HVDC.

Figure 6:
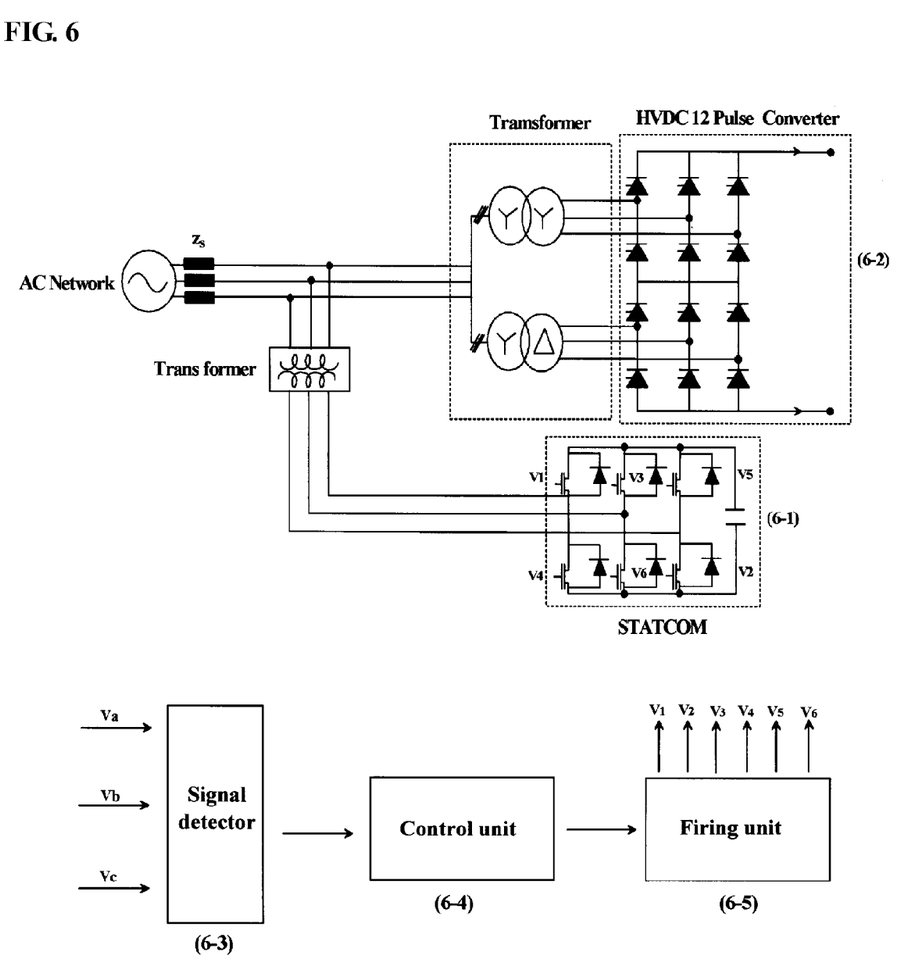
FIG. 6 is a circuitry diagram showing a block diagram showing the STATCOM controller shown in FIG. 5.

FIG. 6 is a circuitry diagram showing a block diagram showing the STATCOM controller shown in FIG. 5.

The STATCOM controller 2-6 includes a signal detector 6-3, a control unit 6-4, and a firing unit 6-5.

The static compensator controller includes a signal detector 6-3, a control unit 6-4, and a firing unit 6-5. The signal detector 6-3 calculates a phase voltage and a phase of a fundamental wave based on a system phase voltage in an FFT manner. The control unit 6-4 generates Q and H command part values based on the phase voltage and the phase of a fundamental wave from the signal detector 6-3. The firing unit 6-5 compares the Q and H command part values with a chopping wave, and generates control voltages V1 through V6 to control the operation of the static compensator 2-6 according to the comparison result. The control voltages V1 through V6 of the firing unit 6-5 turn-on/off first through sixth semiconductor devices V1 through V6.

Figure 7:
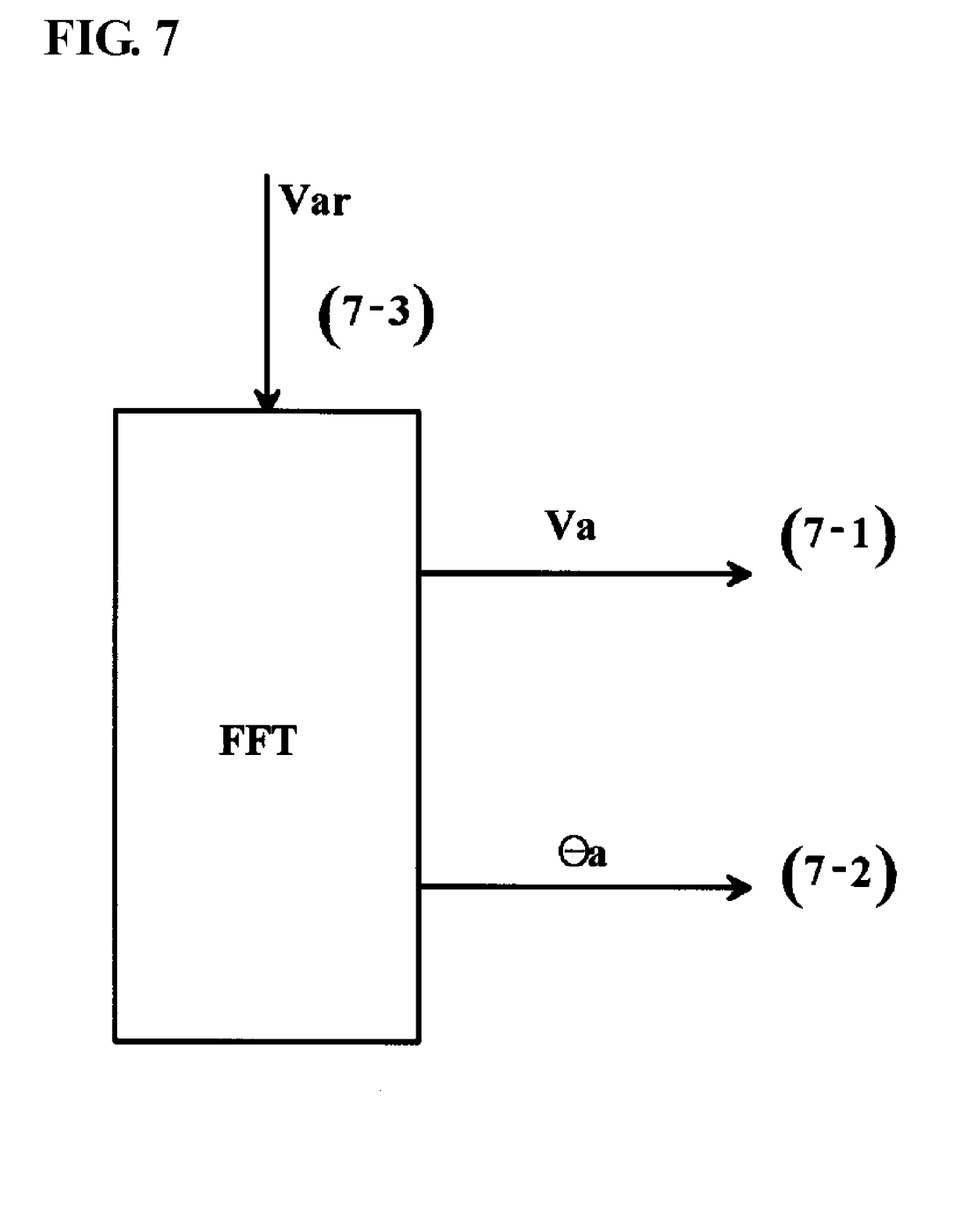
FIG. 7 is a detailed view showing an example of the signal detector of the STATCOM controller shown in FIG. 6.

FIG. 7 is a detailed view showing an example of the signal detector 6-3 of the STATCOM controller shown in FIG. 6. The signal detector 6-3 calculates a phase voltage and a phase of a fundamental wave based on a system phase voltage in an FFT manner.

The control unit of the STATCOM controller includes an H command part value generator and a Q command part value generator.

Figure 8:
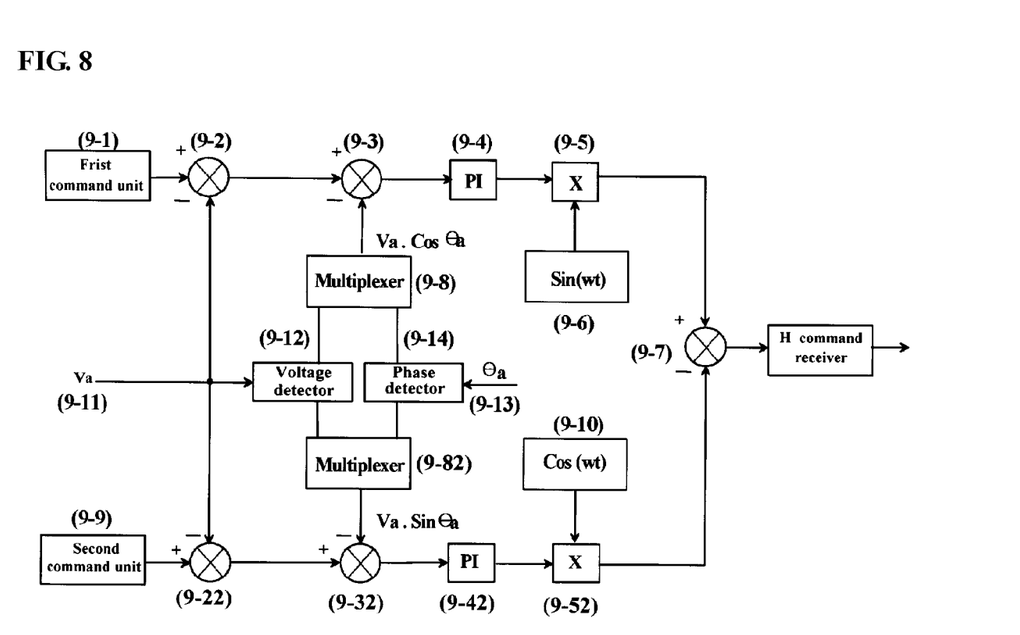
FIG. 8 is a detailed view showing an example of an H command part value generator of the control unit.

FIG. 8 is a detailed view showing an example of an H command part value generator of the control unit 6-4. The H command part value generator of the control unit 6-4 generates the H command part value using a vector control method. The vector control method is as follows. A direct current signal is multiplied by an item cosine to make the real number part, and the direct current signal is multiplied by an item sine to make an imaginary number part. The real number part and the imaginary number part and combined with each other to obtain a command signal.

A first subtractor 9-2 subtracts the phase voltage of the fundamental wave from the signal detector 6-3 from a first commanded value of a first command unit 9-1 to obtain a command value.

A first voltage detector 9-12 detects the phase voltage $V_a$ of the fundamental wave from the signal detector 603.

A first phase detector 9-14 detects the fundamental wave $\theta_a$ of the fundamental wave.

A first multiplexer 9-8 multiplexes the phase voltage $V_a$ of the fundamental wave detected by the first voltage detector 9-12 and the fundamental wave $\theta_a$ of the fundamental wave detected by the first phase detector 9-14 to obtain a phase-vector combined signal $V_a \cdot \cos\theta_a$. A first mixer 9-3 mixes the command value from the first subtractor 9-2 and the phase-vector combined signal $V_a \cdot \cos\theta_a$ by scalar product.

A first PI controller 9-4 outputs an error signal of an output of the first mixer 9-3.

A first multiplier 9-5 multiplies the error signal from the first mixer 9-3 by sin(wt), which is an output of a first frequency converter 9-6, thereby outputting an imaginary part of the command value.

In the same manner, a second subtractor 9-22 subtracts the phase voltage of the fundamental wave from the signal detector 6-3 from a second commanded value of a second command unit 9-9 to obtain a command value.

A second multiplexer 9-82 multiplexes the phase voltage $V_a$ of the fundamental wave detected by the voltage detector 9-12 and the fundamental wave $\theta_a$ of the fundamental wave detected by the phase detector 9-14 to obtain a second phase-vector combined signal $V_a \cdot \sin\theta_a$. A second mixer 9-32 mixes the command value from the second subtractor 9-22 and the second phase-vector combined signal $V_a \cdot \sin\theta_a$ by scalar product.

A second PI controller 9-42 outputs an error signal of an output of the second mixer 9-32.

A second multiplier 9-52 multiplies the error signal from the second PI controller 9-4 by cos(wt), which is an output of a second frequency converter 9-10, thereby outputting a real part of the command value.

A third mixer 9-7 mixes an output of the first multiplier 9-5 and an output of the second multiplier 9-52 to obtain an H command part value.

Figure 9:
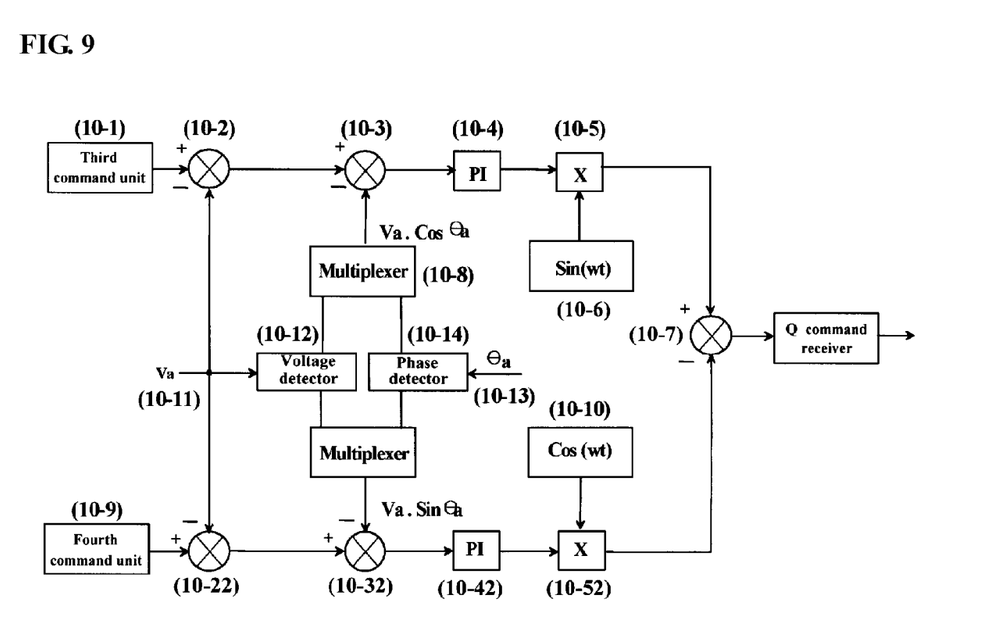
FIG. 9 is a detailed view showing an example of a Q command part value generator of the control unit.

FIG. 9 is a detailed view showing an example of a Q command part value generator of the control unit.

The Q command part value generator of the control unit 6-4 generates the Q command part value using a vector control method. The vector control method is as follows. A direct current signal is multiplied by an item cosine to make the real number part, and the direct current signal is multiplied by an item sine to make an imaginary number part. The real number part and the imaginary number part and combined with each other to obtain a command signal.

The Q command part value generator has the same functions as those of the H command part value generator shown in FIG. 8 described above.

A third subtractor 10-2 subtracts the phase voltage of the fundamental wave from the signal detector 6-3 from a first commanded value of a third command unit 10-1 to obtain a command value.

A second voltage detector 10-12 detects the phase voltage Va of the fundamental wave from the signal detector 6-3.

A second phase detector 10-14 detects the fundamental wave $\theta_a$ of the fundamental wave.

A third multiplexer 10-8 multiplexes the phase voltage $V_a$ of the fundamental wave detected by the second voltage detector 10-12 and the fundamental wave $\theta_a$ of the fundamental wave detected by the second phase detector 10-14 to obtain a phase-vector combined signal $V_a \cdot \cos \theta_a$. A fourth mixer 10-3 mixes the command value from the third subtractor 10-2 and the first phase-vector combined signal $V_a \cdot \cos \theta_a$ by scalar product.

A third PI controller 10-4 outputs an error signal of an output of the fourth mixer 10-3.

A third multiplier 10-5 multiplies the error signal from the fourth mixer 10-3 by sin(wt), which is an output of a third frequency converter 10-6, thereby outputting an imaginary part of the command value.

In the same manner, a fourth subtractor 10-22 subtracts the phase voltage of the fundamental wave from the signal detector 6-3 from a second commanded value of a second command unit 10-9 to obtain a command value.

A fourth multiplexer 10-82 multiplexes the phase voltage $V_a$ of the fundamental wave detected by the second voltage detector 10-12 and the fundamental wave $\theta_a$ of the fundamental wave detected by the second phase detector 10-14 to obtain a second phase-vector combined signal $V_a \cdot \sin \theta_a$. A fifth mixer 10-32 mixes the command value from the fourth subtractor 10-22 and the second phase-vector combined signal $V_a \cdot \sin \theta_a$ by scalar product.

A fourth PI controller 10-42 outputs an error signal of an output of the fifth mixer 10-32.

A fourth multiplier 10-52 multiplies the error signal from the PI controller 10-42 by cos(wt), which is an output of a fourth frequency converter 10-10, thereby outputting a real part of the command value.

A sixth mixer 10-7 mixes an output of the third multiplier 10-5 and an output of the fourth multiplier 10-52 to obtain the Q command part value.

Figure 10:
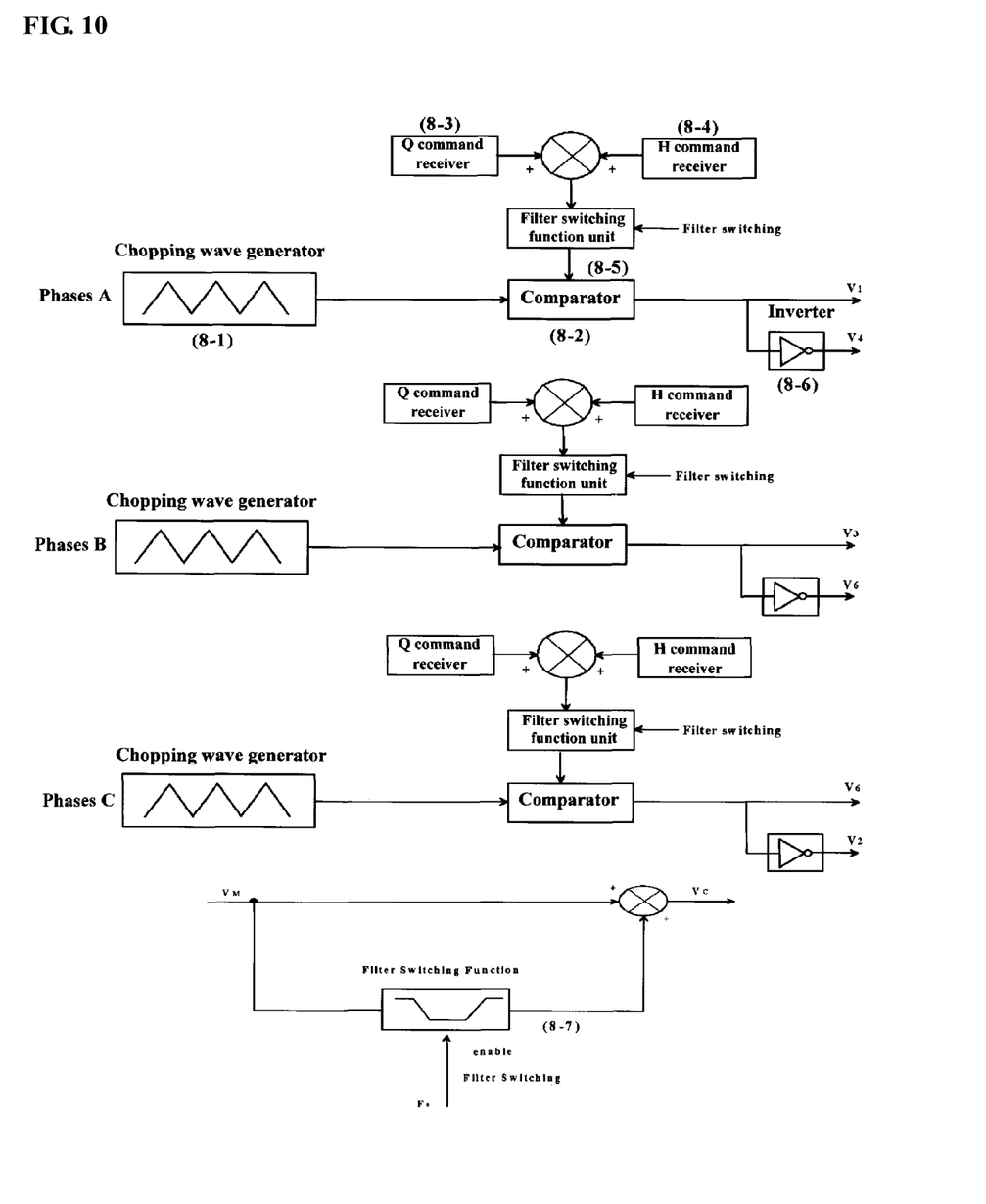
FIG. 10 is a detailed view showing an example of a firing unit of the control unit.

FIG. 10 is a detailed view of the firing unit 6-5 of the STATCOM controller shown in FIG. 6. The firing unit 6-5 includes a chopping wave generator 8-1, a comparator 8-2, a Q command receiver 8-3, an H command receiver 8-4, a filter switching function unit 8-5, and an inverter 8-6. The chopping wave generator 8-1 generates a chopping wave. The Q command receiver 8-3 receives and outputs a Q command value from the control unit 6-4. The H command receiver 8-4 receives and outputs an H command value from the control unit 6-4. The filter switching function unit 8-5 corrects the Q and H command values from the Q and H command units 8-3 and 8-4 by a filter switching. The comparator 8-2 compares the corrected command value from the corrected command unit 8-5 with the chopping wave from the chopping wave generator, and generates signals V1 through V6. When a filter switching signal Fs is applied to the corrected command unit, a command value VM is corrected to a value VC by a filter switching function. That is, the Q command unit 8-3 functions to compensate the invalid power, and the H command unit 8-4 functions to remove the harmonic wave.

Although example embodiments of the present invention have been shown and described, it should be appreciated by those skilled in the art that changes might be made in these example embodiments without departing from the principles and spirit of the present invention.

What is claimed is:

1. A static compensator apparatus for a high voltage direct current system, comprising:
   a static compensator, which is turned-on in a normal mode and is adapted to compensate for invalid power and to remove a harmonic wave generated by the high voltage direct current system;
   a static compensator controller adapted to control an operation of the static compensator; and
   a diesel power generator adapted to operate complementarily to the static compensator and which is turned-on when the high voltage direct current system starts:
   wherein the static compensator controller includes:
      a signal detector adapted to calculate a phase voltage and a phase of a fundamental wave based on a system phase voltage in an FFT manner;
      a control unit adapted to generate Q and H command part values based on the phase voltage and the phase of a fundamental wave from the signal detector; and
      a firing unit adapted to compare the Q and H command part values with a chopping wave, and to generate control voltages to control the operation of the static compensator according to a comparison result;
   wherein the control unit includes:
      an H command part value generator adapted to generate the H command part value and a Q command part value generator adapted to generate the Q command part value;
   wherein the H command part value generator includes:
      a first subtracter adapted to subtract the phase voltage of the fundamental wave from the signal detector from a first command value of a first command unit to obtain a command value;
      a first multiplexer adapted to multiplex the phase voltage of the fundamental wave from the signal detector and the phase of the fundamental wave detected from the signal detector to obtain a first phase-vector combined signal $V_a \cdot \cos \theta_a$, $V_a$ representing the phase voltage, $\theta_a$ representing the phase;
      a first mixer adapted to mix the first command value from the first subtracter and the first phase-vector combined signal by scalar product;
      a first PI controller adapted to output an error signal of an output of the first mixer;

a first multiplier adapted to multiply the error signal from the first mixer by sin (wt), which is an output of a first frequency converter;
a second subtracter adapted to subtract the phase voltage of the fundamental wave from the signal detector from a second command value of a second command unit to obtain a command value;
a second multiplexer adapted to multiplex the phase voltage of the fundamental wave from the signal detector and the phase of the fundamental wave detected from the signal detector to obtain a second phase-vector combined signal $V_a \cdot \sin \theta_a$;
a second mixer adapted mixing the command value from the second subtracter and the second phase-vector combined signal from the second multiplexer by scalar product;
a second PI controller adapted to output an error signal of an output of the second mixer;
a second multiplier adapted to multiply the error signal from the second mixer by cos (wt); and
a third mixer adapted to mix an output of the first multiplier and an output of the second multiplier to generate the H command part value; and
wherein the Q command part value generator includes:
a third subtracter adapted to subtract the phase voltage of the fundamental wave from the signal detector from a third command value of a third command unit to obtain a command value;
a third multiplexer adapted to multiplex the phase voltage of the fundamental wave from the signal detector and the phase of the fundamental wave detected from the signal detector to obtain a first phase-vector combined signal $V_a \cdot \cos \theta_a$;
a fourth mixer adapted to mix the third command value from the third subtracter and the first phase-vector combined signal from by scalar product;
a third PI controller adapted to output an error signal of an output of the fourth mixer;
a third multiplier adapted to multiply the error signal from the fourth mixer by sin (wt);
a fourth subtracter adapted to subtract the phase voltage of the fundamental wave from the signal detector from a fourth command value of a fourth command unit to obtain a command value;
a fourth multiplexer adapted to multiplex the phase voltage of the fundamental wave from the signal detector and the phase of the fundamental wave detected from the signal detector to obtain a second phase-vector combined signal $V_a \cdot \sin \theta_a$;
a fifth mixer adapted to mix the command value from the fourth substracter and the second phase-vector combined signal from the fourth multiplexer by scalar product;
a fourth PI controller adapted to output an error signal of an output of the fifth mixer;
a fourth multiplier adapted to multiply the error signal from the fifth mixer by cos (wt), which is an output of a fourth frequency converter; and
a sixth mixer adapted to mix an output of the second multiplier and an output of the fourth multiplier to generate the Q command part value.

2. A static compensator apparatus for a high voltage direct current system, comprising:
a static compensator, which is turned-on in a normal mode and is adapted to compensate for invalid power and to remove a harmonic wave generated by the high voltage direct current system;
a static compensator controller adapted to control an operation of the static compensator; and
a diesel power generator adapted to operate complementarily to the static compensator and which is turned-on when the high voltage direct current system starts;
wherein the static compensator controller includes:
a signal detector adapted to calculate a phase voltage and a phase of a fundamental wave based on a system phase voltage in an FFT manner;
a control unit adapted to generate Q and H command part values based on the phase voltage and the phase of a fundamental wave from the signal detector; and
a firing unit adapted to compare the Q and H command part values with a chopping wave, and to generate control voltages to control the operation of the static compensator according to a comparison result;
wherein the firing unit includes:
a chopping wave generator adapted to generate a chopping wave;
a filter switching function unit adapted to correct the Q and H command values from the control unit by a filter switching to obtain a command value; and
a comparator adapted to compare the corrected command value from a corrected command unit with the chopping wave from the chopping wave generator, and to generate control voltages.

3. A static compensator apparatus for a high voltage direct current system, comprising:
a static compensator, which is turned-on in a normal mode and is adapted to compensate for invalid power and to remove a harmonic wave generated by the high voltage direct current system;
a static compensator controller adapted to control an operation of the static compensator;
a diesel power generator adapted to operate complementarily to the static compensator and which is turned-on when the high voltage direct current system starts; and
a mean gamma controller adapted to monitor an average of gamma values in the high voltage direct current system, and to output the monitored average of gamma values as a control input of the static compensator.

4. The static compensator apparatus for a high voltage direct current system according to claim 3, wherein the static compensator controller includes:
a signal detector adapted to calculate a phase voltage and a phase of a fundamental wave based on a system phase voltage in an FFT manner;
a control unit adapted to generate Q and H command part values based on the phase voltage and the phase of a fundamental wave from the signal detector; and
a firing unit adapted to compare the Q and H command part values with a chopping wave, and to generate control voltages to control the operation of the static compensator according to a comparison result.

* * * * *